United States Patent [19]

Moriguchi et al.

[11] Patent Number: 4,560,988

[45] Date of Patent: Dec. 24, 1985

[54] THERMAL HEAD DRIVING METHOD

[75] Inventors: Haruhiko Moriguchi; Toshiharu Inui; Takashi Ohmori, all of Kanagawa, Japan

[73] Assignee: Fuji Xerox Co., Ltd., Tokyo, Japan

[21] Appl. No.: 399,147

[22] Filed: Jul. 16, 1982

[30] Foreign Application Priority Data

Jul. 17, 1981 [JP] Japan .............................. 56-110766

[51] Int. Cl.[4] .............................. G01D 15/10

[52] U.S. Cl. .............................. 346/1.1; 346/76 PH; 400/120

[58] Field of Search .............................. 346/76 PH, 1.1; 400/120

[56] References Cited

U.S. PATENT DOCUMENTS

| | | | |
|---|---|---|---|
| 4,149,171 | 4/1979 | Sato et al. | 346/76 PH X |
| 4,369,452 | 1/1983 | Anno et al. | 346/76 PH |
| 4,377,922 | 3/1983 | O'Neil | 346/76 PH X |
| 4,412,228 | 10/1983 | Moriguchi et al. | 346/76 PH |

*Primary Examiner*—E. A. Goldberg
*Assistant Examiner*—Gerald E. Preston
*Attorney, Agent, or Firm*—Sughrue, Mion, Zinn Macpeak & Seas

[57] ABSTRACT

A thermal head for use in thermal printing is operated according to a method in which the data of one line are recorded divisionally, with recording operations for the first and second halves of a line being carried out alternatingly and repeatedly.

5 Claims, 14 Drawing Figures

FIG. 1
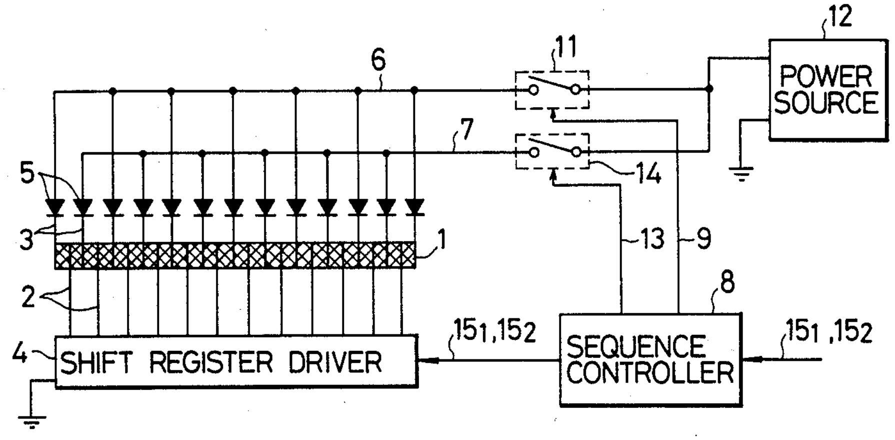
FIG. 2a
FIG. 2b
FIG. 2c
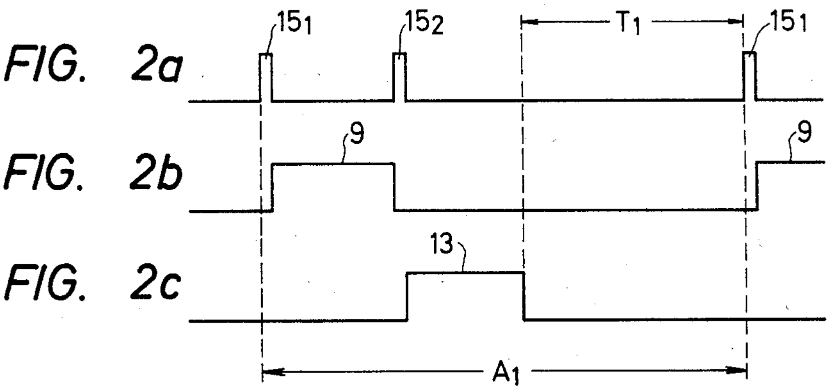
FIG. 3
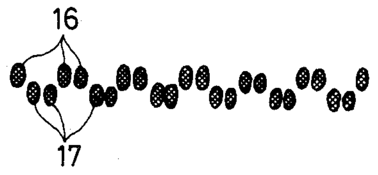

FIG. 5a
FIG. 5b
FIG. 5c
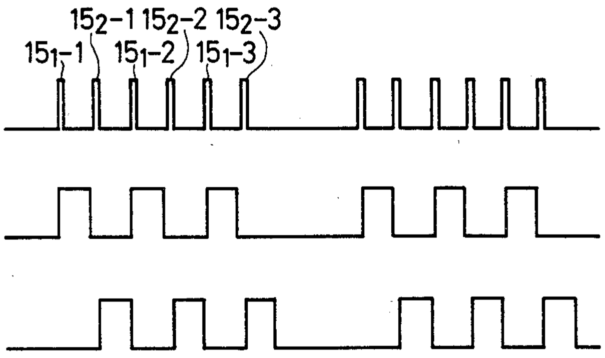
FIG. 6a
FIG. 6b
FIG. 6c
FIG. 6d
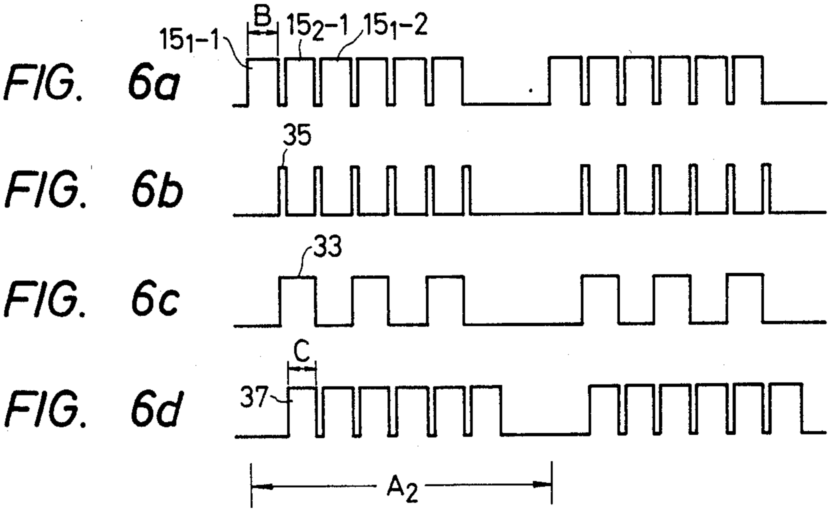

THERMAL HEAD DRIVING METHOD

BACKGROUND OF THE INVENTION

The present invention relates to a thermal head driving method for performing thermal recording in which heat generating elements juxtaposed in the thermal head along a scanning line are divisionally driven a number of times to complete one line recording.

In a thermal recorder which performs thermal recording upon heat sensitive paper or a heat-transferable ink donor sheet, a thermal head is extensively employed as a means for generating heat pulses corresponding to recording data.

FIG. 1 is an explanatory diagram for describing a conventional thermal head driving method. In the thermal head of the illustrated thermal recorder, lead wires 2 and 3 are alternately connected from opposing sides to a heat generating unit 1 at given itervals. The other ends of the lead wires 2 are connected to parallel signal output terminals of a shift register driver 4. The other ends of the lead wires 3 are connected alternately to first and second common electrodes 6 and 7 through respective diodes 5. The voltage of a power source 12 is applied to the first common electrode 6 through a first switch circuit 11 which is actuated in response to a first common drive signal 9 produced from a sequence controller 8. Likewise, the voltage of the power source 12 is applied to the second common electrode 7 through a second switch circuit 14 which is actuated in response to a second common drive signal 13 produced from the sequence controller 8.

First and second halves of one line data $15_1$ and $15_2$ are supplied as data to the sequence controller 8 at different times.

When the first half of the line data $15_1$ is produced from the sequence controller 8 (FIG. 2*a*) and set into the shift register driver 4, the first common drive signal 9 is produced from the sequence controller 8 and applied to the first switch circuit 11, for example, during 1 msec (FIG. 2*b*), running from the time instant when the first half of the line data $15_1$ has been set into the shift register driver 4. During this time period, i.e. 1 msec, half of the number of heat generating elements are driven two by two (plus one on either end) and thermal recording for half of one line is thus carried out. Thereafter, the second half of the line data $15_2$ is set into the shift register driver 4. Upon the setting of the second half of the line data $15_2$ being completed, the second common drive signal 13 is produced from the sequence controller 8 (FIG. 2*c*) and applied to the second switch 14, whereby the voltage is applied to the second common electrode 7 and thus the remaining half of the heat generating elements are driven two by two during the period when the second common drive signal 13 is applied to the second switch circuit 14. In this manner, the thermal recording for one line is carried out.

In the thermal recorder of the type described, if the recording paper advances in the sub-scanning direction during the operation of one line recording carried out divisionally over two periods, dots 16 recorded by the application of the voltages to the first common electrode 6 and dots 17 recorded by the application of the voltage to the second common electrode 7 are dislocated in the sub-scanning direction as shown in FIG. 3. Unless the recording positions of picture elements in one line are aligned, reproduceability of a character or a pattern made up of closely spaced segments in the sub-scanning direction, e.g. a character "E", will be extremely degraded.

Heretofore, in order to overcome this drawback, the advancement of the recording paper was halted while the thermal head was effectuating divisional driving, and a time $T_1$ (FIG. 2*a*) for moving the recording paper was disposed after completion of the one line recording. Therefore, according to the conventional thermal head driving method, the time $A_1$ (FIG. 2*c*) necessary for one line recording is the sum of the time for driving the heat generating elements and the time for moving the recording paper. As such, high speed recordation cannot be accomplished.

SUMMARY OF THE INVENTION

In view of the foregoing, an object of the present invention is to provided a thermal head driving method in which the advancement of the recording paper does not need to be halted during the divisional driving of heat generating elements in block by block fashion.

In accordance with the invention, this and other objects are accomplished by repeatedly driving the heat generating elements contained in each block for plural times to complete the recordation of one line.

BRIEF DESCRIPTION OF THE DRAWINGS

In the drawings:

FIG. 1 is a block diagram illustrating the construction of a thermal recorder to which a conventional thermal head driving method is applied;

FIG. 2 is a timing chart for describing the thermal head driving method of the recorder shown in FIG. 1;

FIG. 3 is an explanatory diagram illustrating the dislocation of recording positions resulting from the conventional driving method;

FIG. 5 is a diagram for illustrating the principle of thermal head driving according to the present invention;

FIG. 6 is a timing chart illustrating the thermal head driving method of the thermal head shown in FIG. 4.

DETAILED DESCRIPTION OF THE PREFERRED EMBODIMENT

A preferred embodiment according to the invention will now be described with reference to the accompanying drawings.

Figure 4:
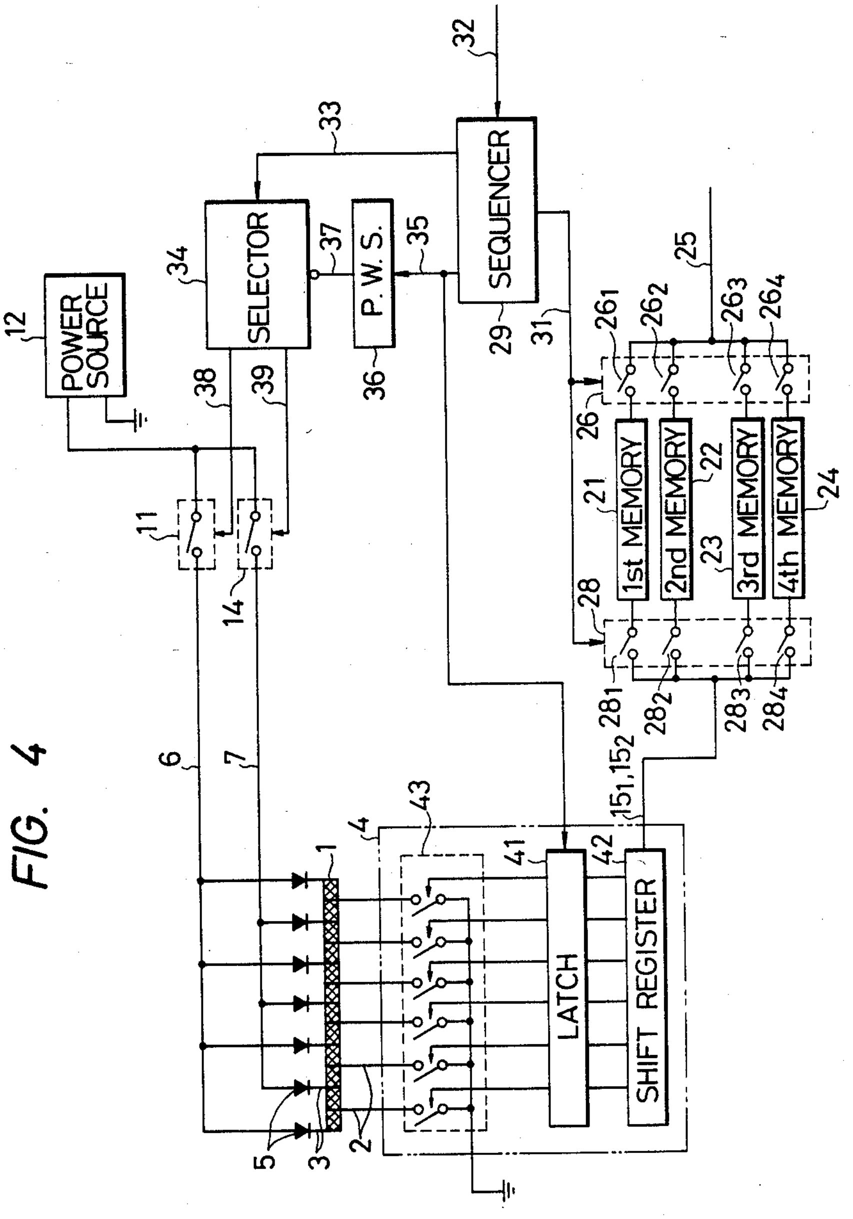
FIG. 4 is a block diagram illustrating the construction of a thermal recorder according to an embodiment of the present invention.

FIG. 4 illustrates a thermal recorder to which the thermal head driving method of the invention is applied, in which like reference numerals denote like components or like parts in FIG. 1. The thermal recorder as illustrated includes four ½ line memories 21 through 24, a third switch circuit 26 which is used for distributing data 25 to be written in the memories 21 through 24, and a fourth switch circuit 28 which is used for controlling the read out operation of the data $15_1$ and $15_2$ The operations of the third and fourth switch circuits 26 and 28 are controlled in response to a memory read/write control signal 31 supplied from a sequencer 29. The latter implements various control operations upon receiving sequence timing clocks 32. Specifically, a selector 34 is operated in response to a select signal 33 produced from the sequencer 29, and in turn the first and second switch circuits 11 and 14 are controlled by the outputs of the selector 34. A pulse width (duration) setter 36 is operated in response to a latch signal 35 produced from sequencer 29, thereby actuating the selector 34 for a predetermined period of time. The latch signal 35 is further applied to a latch circuit 41 to latch data supplied to the shift register 42 and then to drive the driver 43.

Description will now be made for the case where recordation is implemented with a density of 8 dots/mm upon a recording paper of A4 size using the aforementioned recorder. One line data 25 is sequentially supplied to the input side of the third switch circuit 26. The sequencer 29 firstly actuates switches 261 and 262 of the third switch circuit 26 alternately, which are provided corresponding to the first and second ½ line memories 21 and 22, respectively. Thus, firstand second-half line data of the first line are written in the first and second ½ line memories 21 and 22 so that the heat generating unit may be divisionally driven in two parts. Thereafter, the sequencer 29 actuates switches 263 and 264 of the third switch circuit 26 alternately, which are provided corresponding to the third and fourth ½ line memories 23 and 24, respectively, when a subsequent line data is supplied to the input side of the third switch circuit 26. In this manner, the first- and second-half line data of the second line are written into the third and fourth ½ line memories 23 and 24, respectively. The same operations are repeatedly carried out in the same fashion. That is, the first and second ½ line memories 21 and 22 and the third and fourth ½ line memories 23 and 24 are paired, and one line data is alternately written in each pair.

Upon data being written into the first and second ½ line memories 21 and 22, the switch 281, which is provided in the fourth switch circuit 28 corresponding to the first ½ line memory 21, is closed in accordance with the memory write/read control signal 31 produced from the sequencer 29 while the subsequent second one line data is written into the third and fourth ½ line memories 23 and 24. Accordingly, the first-half line data $15_1$-1 of the first line is firstly read out from the first ½ line memory 21 and is set into the shift register 42 (FIG. 5*a*). Upon completion of the setting of the data $15_1$-1 therein, the first switch circuit 11 is actuated, and the recording operation of the first-half of the first line data $15_1$ is carried out (FIG. 5*b*). This is the first recording operation for the first-half line data $15_1$-1 of the first line. After the recording operation is carried out, the recording operation of the second-half of the first line data $15_2$-1 (FIG. 5*a*) having been set in the shift register 42 (FIG. 5*c*) is carried out. This is the first recording operation for the second-half line data $15_2$-1 of the first line. The second and third recording operations for the first- and second-half of the first line data, i.e. $15_1$-2, $15_2$-2, $15_1$-3 and $15_2$-3, are repeatedly carried out upon repeatedly and alternately setting the first- and second-half line data of the first line data in the shift register 42.

FIGS. 6*a* through 6*d* are waveform diagrams for concretely describing the recording operations as principally described hereinabove. The number of data to be set into the shift register is approximately 850 bits under the recording condition as described. Thus, in the case where data transfer is implemented at the rate of 1 MHz, the data set time B in the shift register is approximately 0.85 msec (FIG. 6*a*). At the time instant when the first-half of the first line data $15_1$-1 is set into the shift register 42, the sequencer 29 produces the latch signal 35 (FIG. 6*b*) and the select signal 33 (FIG. 6*c*) at the same time. When the latch signal 35 is produced therefrom, the first-half of the first line data outputted in parallel form from the shift register 42 is latched into the latch circuit 41, and the driver 43 is driven. Concurrent with the driving of the driver 43, the pulse width setter 36 is operated to produce a selector-chip-enable signal 37 (FIG. 6*d*) for a duration of time C during which time the heat generating elements can be driven. The time C is determined so that the temperature of the heat recording element becomes slightly lower than the temperature necessary for recordation in the first recording operation. In this embodiment, the time C is set to be 0.8 msec, which is approximately equal to the data setting time B.

The selector 34 is placed in an activated condition by the application of the selector-chip-enable signal 37 thereto and it produces the first common drive signal 38 in response to the H level select signal 33 which has been supplied thereto from the sequencer 29. Upon reception of the common drive signal 38, the first switch circuit 11 is closed so that the voltage of the power source 12 is applied to the first common electrode 6. As a result, the heat generating elements between the lead wires 2 grounded by the driver 43 and the lead wires 3 connected to the first common electrode 6 generate heat, and thus the first recording operation with regard to the first half of the first line data $15_1$-1 is carried out.

When the first half of the first line data $15_1$-1 is latched into the latch circuit 41, the switch 282 of the fourth switch circuit 28 is closed in response to the memory read/write control signal 31 and the second half of the first line data $15_2$-1 is immediately supplied to the shift register 42. Upon reception of the L level select signal 33, the selector 34 produces the second common drive signal 39. While the recording operation of the second-half of the first line data $15_2$-1 is carried out, the first-half of the first line data $15_2$-1 is again being set into the shift register 42. In this fashion, while one half line data is subjected to the recording operation, the counterpart data of that line is set in the shift register 42 (FIGS. 6*a* and 6*d*). Therefore, although a data set time of six times the length of the data set time for each of the first- and second-half data $15_1$ and $15_2$ is needed according to this embodiment, it should be understood that the time $A_2$ (FIG. 6) necessary for recording one line data is not prolonged.

When the line recording operation is carried out in the manner described, the temperature of the heat generating unit 1 gradually increases and thermal recording is effected when the second or third recording operation for the first- and second-half line data is carried out. Hence, even though the recording paper advances in the sub-scanning direction during the recording operation, the recording positions of the picture elements in one line can be substantially arranged along a straight line. After recordation of the first line, the switches 283 and 284 of the fourth switch circuit 28 repeatedly carry out opening and closing operations and hence the recordation of the second line is carried out.

Figure 7:
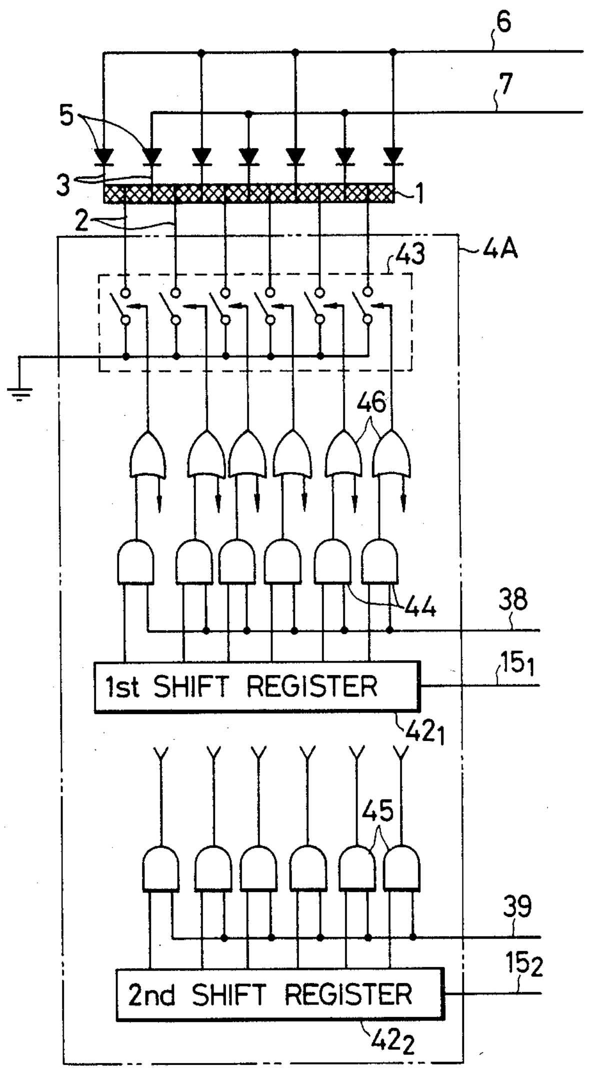
FIG. 7 is a circuit diagram illustrating a modification of a shift register driver according to the present invention.

Shown in FIG. 7 is a modification of the shift register driver 4 using two shift registers, in which reference numeral 4A denotes the shift register driver and like numerals denote like parts or like components in FIG. 4.

It is preferred that the driving pulse duration for driving the heat generating element is less than ½ that of the conventional case. That is, the preferred driving pulse duration is in the range from 0.2 to 0.8 msec. In the foregoing embodiment, the set time for setting the data in the shift register is approximately 0.85 msec. Therefore, effective recording can not be accomplished if the driving pulse duration is set to, for example, 0.5 msec. In such a case, the set time can be shortened by setting data into the shift registers divided into blocks. However, according to this method, the array of the data to be applied to the shift register should be previously arranged, and thus the data processing is somewhat complicated.

In this case, it is effective to provide two shift registers $42_1$ and $42_2$ in the shift register driver **4*a* as shown in FIG. 7. The first shift register $42_1$ serves to exclusively set the first data $15_1$ while the second shift register $42_2$ serves to exclusively set the second data $15_2$. The output terminals of the first shift register $42_1$ are connected to one input of two-input AND gates 44, to the other input of each of which the first common drive signal 38 is fed. Likewise, the output terminals of the second shift register $42_2$ are connected to one input of two-input AND gates 45, to the other inputs of which the second common drive signal 39 is fed. The outputs of the two-input AND gates 44 and 45 are connected to the input terminals of OR gates 46 which are provided corresponding to the image signal, and the output terminals of the OR gates are connected to the control terminals corresponding to the driver 43**.

Using the shift register driver 4A, it is possible to repeatedly carry out recording operations a desired number of times whenever the first or second common drive signal 38 or 39 is supplied, if the line data are dividedly set in the first and second shift registers $42_1$ and $42_3$.

As described, in accordance with the invention, it is possible to simplify the controlling mechanism of the paper advancer, since the stoppage or control of the advancement of the recording paper need not be precisely performed. Thus, the thermal recorder can be manufactured inexpensively.

In further accordance with the invention, the amount of heat generated by the respective heat generating elements can be made substantially uniform irrespective of a variation in the voltage of the power source, since the period of the divisional driving of the respective heat generating elements is shortened and one line recordation is carried out by driving such heat generating elements plural times. Thus, the quality of the recordation can be enhanced.

Although there has been described a thermal head driving method using a continuously formed heat generating unit, the present invention is not limited thereto or thereby. Specifically, in a thermal recorder of the type in which a plurality of heat generating elements are juxtaposed along the scanning line and a plural set of heat generating elements are divisionally driven a certain number of times to record one line data, the advantage or operational effect as attained by the present invention can also be attained by repeatedly carrying out divisional driving a number of times. Moreover, although in FIG. 7, the heat generating unit is divided into two blocks, the number of blocks is of course not limited thereto.

What is claimed is:

1. In a method for driving a thermal head wherein a plurality of heat generating elements arranged in the thermal head are divided into a predetermined number of blocks and the heat generating elements in the respective blocks are driven at different times to carry out the recordation of one line, the improvement comprising the steps of:

- dividing the data for recording one line into at least two parts and storing each said part in a separate memory;
- alternatingly reading out said data from said memories into a single shift register, the data for one portion of said line being latched synchronously with the reading out of the data for another portion of said line from the memory therefor; and,
- alternately and repeatedly driving the heat generating elements in each block to record one line.

2. A method as claimed in claim 1, wherein the data for recording one line are divided into at least two parts, each said data part being applied as inputs to said heat generating elements alternatingly.

3. A method as claimed in claim 2, a driving operation for each said data part being carried out at least two times.

4. A method as claimed in claim 1, including reading out said data from said memories into shift registers provided exclusively for the data of a particular memory.

5. A method as claimed in claim 2 , wherein a time period of said driving operation is insufficient for recordation of said data in a single driving step.

* * * * *